(12) United States Patent
Fukui

(10) Patent No.: US 6,928,239 B2
(45) Date of Patent: Aug. 9, 2005

(54) STROBE LIGHT PHOTOGRAPHING SYSTEM

(75) Inventor: Hajime Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/786,898

(22) Filed: Feb. 24, 2004

(65) Prior Publication Data

US 2004/0170420 A1 Sep. 2, 2004

(30) Foreign Application Priority Data

Feb. 27, 2003 (JP) ........................................ 2003-050360

(51) Int. Cl.⁷ ............................................... G03B 15/05
(52) U.S. Cl. ........................ 396/61; 396/157; 396/159
(58) Field of Search ........................... 396/61, 157, 159

(56) References Cited

U.S. PATENT DOCUMENTS

| | | | | |
|---|---|---|---|---|
| 5,892,987 A | * | 4/1999 | Ohmori | ........................ 396/61 |
| 6,240,253 B1 | | 5/2001 | Yamaguchi et al. | ........... 396/51 |
| 6,577,820 B2 | | 6/2003 | Yamaguchi et al. | ........... 396/61 |
| 2004/0170417 A1 | | 9/2004 | Fukui | ........................... 396/61 |

FOREIGN PATENT DOCUMENTS

JP          3-287240 A       12/1991       ............ G03B/7/16

* cited by examiner

*Primary Examiner*—William B. Perkey
(74) *Attorney, Agent, or Firm*—Morgan & Finnegan, LLP

(57) ABSTRACT

Strobe light emission is controlled with precision with precision of distance information. A photometry unit measures light reflected by an object to be photographed by preliminary emission in a collection of divided regions. An object distance detection unit detects an object distance. A distance precision determination unit determines a distance precision. A first calculation unit calculates a proper photometry level from an object distance. A second calculation unit calculates an identification level for identifying an abnormal reflection region on the basis of the proper photometry level and a distance precision. A determination unit compares the photometry values of the divided regions with the identification level, thereby determining an abnormal reflection region. A third calculation unit calculates the photometry values of reflected object light in the divided regions from which the abnormal reflection region is excluded. Strobe light photography is performed by controlling the main emission amount by the photometry values.

15 Claims, 10 Drawing Sheets

FIG. 3

| P(0, 0) | P(1, 0) | P(2, 0) | P(3, 0) | P(4, 0) | P(5, 0) | P(6, 0) |
|---------|---------|---------|---------|---------|---------|---------|
| P(0, 1) | P(1, 1) | P(2, 1) | P(3, 1) | P(4, 1) | P(5, 1) | P(6, 1) |
| P(0, 2) | P(1, 2) | P(2, 2) | P(3, 2) | P(4, 2) | P(5, 2) | P(6, 2) |
| P(0, 3) | P(1, 3) | P(2, 3) | P(3, 3) | P(4, 3) | P(5, 3) | P(6, 3) |
| P(0, 4) | P(1, 4) | P(2, 4) | P(3, 4) | P(4, 4) | P(5, 4) | P(6, 4) |

| OBJECT DISTANCE | CLASS 1 | CLASS 2 |
|---|---|---|
| 0 ~ 50f | 2.0 | 2.5 |
| 50f ~ 75f | 2.0 | 2.5 |
| 75f ~ 100f | 2.5 | 3.0 |
| 100f ~ 150f | 3.0 | 3.5 |
| 150f OR MORE | 4.0 | 4.0 |

FIG. 10

|  |  | EXCLUSION REGION | LIGHT ADJUSTMENT REGION |  |  |  |
|---|---|---|---|---|---|---|
| P(0, 0) | P(1, 0) | P(2, 0) | P(3, 0) | P(4, 0) | P(5, 0) | P(6, 0) |
| P(0, 1) | P(1, 1) | P(2, 1) | P(3, 1) | P(4, 1) | P(5, 1) | P(6, 1) |
| P(0, 2) | P(1, 2) | P(2, 2) | P(3, 2) | P(4, 2) | P(5, 2) | P(6, 2) |
| P(0, 3) | P(1, 3) | P(2, 3) | P(3, 3) | P(4, 3) | P(5, 3) | P(6, 3) |
| P(0, 4) | P(1, 4) | P(2, 4) | P(3, 4) | P(4, 4) | P(5, 4) | P(6, 4) |

STROBE LIGHT PHOTOGRAPHING SYSTEM

FIELD OF THE INVENTION

This invention relates to an improvement of a strobe light photographing system which causes a strobe light to preliminarily emit light toward an object to be photographed, and calculates an main emission amount for obtaining correct exposure.

BACKGROUND OF THE INVENTION

In automatic exposure photographing by adjusting light from a strobe light that is reflected by an object to be photographed, if an object with high reflectance such as a glass or mirror exists on the object side, exposure is adjusted to the high-reflectance object, resulting in underexposure of a principal object.

Japanese Patent Laid-Open No. 3-287240 discloses an automatic light adjustment camera. More specifically, the strobe light preliminarily emits light immediately before photographing on the assumption that a principal object is located at an in-focus distance. Light reflected by the object is measured using a photometry sensor capable of dividing the photographing region into a plurality of regions and measuring light in each region. When the photometry result of a given region is higher than the brightness at the photographing distance, a high-reflectance object is determined to exist in this region. This region is excluded from the light adjustment region, eliminating the influence of regular reflection (high reflection).

The automatic light adjustment camera disclosed in patent reference 1 can prevent underexposure by excluding an abnormal reflection region corresponding to a high-reflectance object such as a glass facing the camera. However, an abnormal reflection region cannot be accurately determined from, e.g., a lens having low distance information precision (meaning the precision of information (distance information) obtained by converting the position of a focusing lens after focus adjustment into an object distance), or a short-focus lens through which the object distance cannot be accurately obtained as the object distance becomes longer.

SUMMARY OF THE INVENTION

Accordingly, it is an object of the present invention to provide a strobe light photographing system capable of performing preferable strobe light emission control in accordance with the precision of distance information.

A exemplary system which includes a camera body, an interchangeable lens mounted on the camera body, and a strobe light mounted on the camera body, and performs preliminary emission before main emission in strobe light photographing, comprising: a unit which has a plurality of regions for splitting a field into a plurality of fields and performing photometry, and measures light reflected by an object to be photographed by preliminary emission in the plurality of regions; a unit which detects distance information of the object from a position of a focusing lens; a unit which determines precision of the distance information; a unit which calculates a proper photometry level from the distance information; a unit which calculates an identification level for identifying an abnormal reflection region on the basis of the proper photometry level and a distance precision set in accordance with a determination result of the precision; a unit which compares photometry values of the plurality of regions or light adjustment regions out of the plurality of regions with the identification level, thereby determining an abnormal reflection region; and a unit which controls an main emission amount by photometry values of reflected object light in the plurality of regions or the light adjustment regions out of the plurality of regions from which the abnormal reflection region is excluded.

The invention is particularly advantages since it can provide the strobe light photographing system capable of performing optimal strobe light emission control in accordance with the precision of distance information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view for explaining the arrangement of an illustrative photometry sensor in the strobe light photographing system according to the embodiment of the present invention;

FIG. 8 is a table showing the contribution of object distance information in the strobe light photographing system according to the embodiment of the present invention;

FIG. 10 is a view for explaining the abnormal reflection region and light adjustment region according to the embodiment of the present invention.

DETAILED DESCRIPTION OF THE PREFERRED EMBODIMENTS

Preferred embodiments of the present invention will now be described in detail in accordance with the accompanying drawings.

Figure 1:
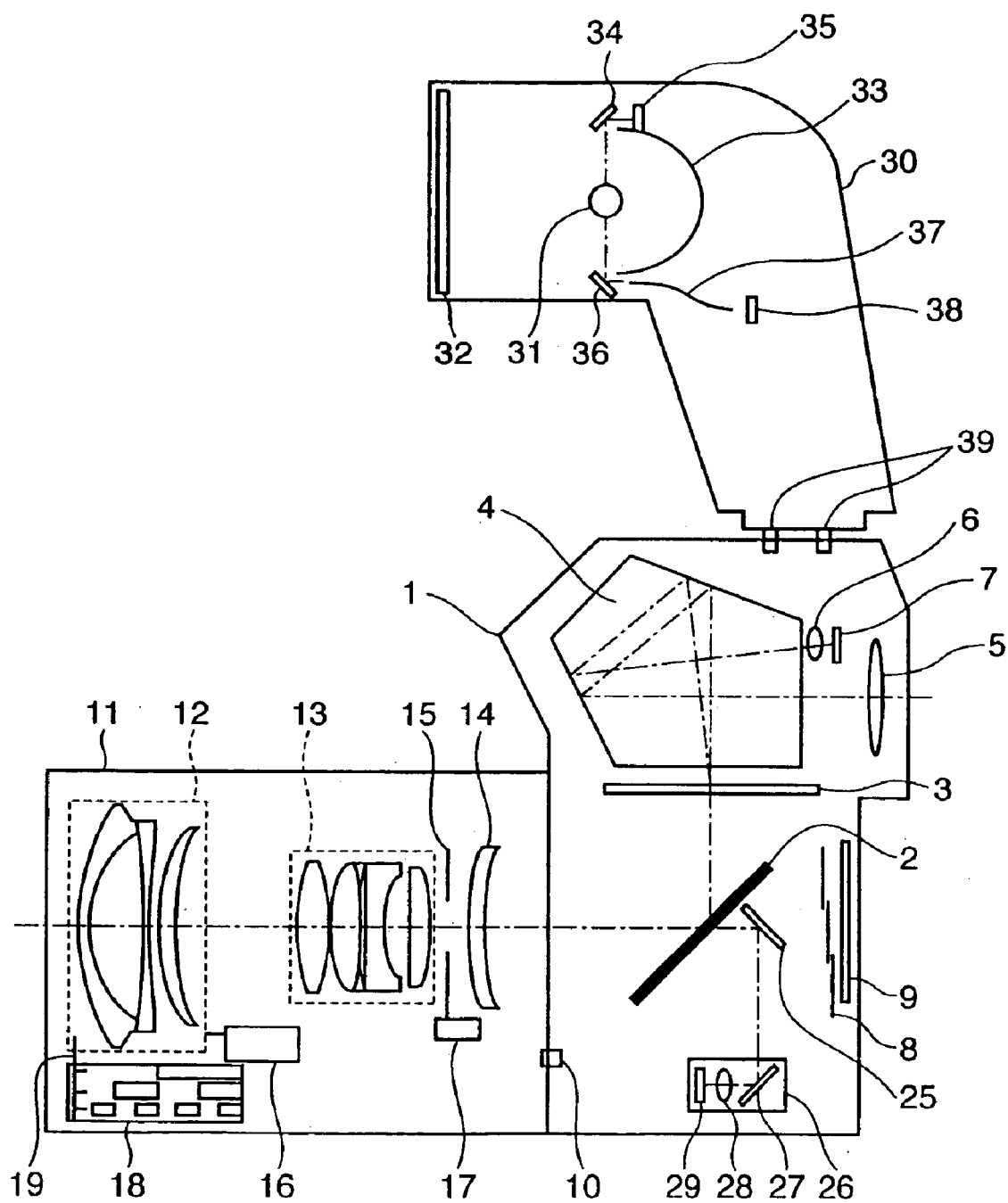
FIG. 1 is a sectional view showing an illustrative strobe light photographing system including a single-lens reflex camera and a strobe light mounted on the camera according to an embodiment of the present invention.

FIG. 1 is a sectional view showing a strobe light photographing system including a single-lens reflex camera and a strobe light mounted on the camera according to an embodiment of the present invention. FIG. 1 mainly shows an optical arrangement relationship.

In FIG. 1, reference numeral 1 denotes a camera body whose front surface is equipped with a photographing lens 11. The camera body 1 incorporates optical components, mechanical components, electrical circuits, an image sensing element (e.g., film or CCD), and the like. The camera body 1 can take a picture or photograph an image. Reference numeral 2 denotes a main mirror which is obliquely inserted in a photographing optical path in a viewfinder observation state, and retracted from the photographing optical path in a photographing state. The main mirror 2 is a half-mirror, and when it is obliquely inserted in the photographing optical path, transmits almost half of rays from an object to be photographed to a focus detection optical system (to be described later).

Reference numeral 3 denotes a focusing screen which forms a viewfinder optical system and arranged on the prospective imaging plane of lenses 12 to 14 (to be described later). Reference numeral 4 denotes a pentaprism for changing the viewfinder optical path. Reference numeral 5 denotes an eyepiece. The photographer sees the focusing screen 3 through this window and can observe the photographing frame. Reference numerals 6 and 7 denote an imaging lens and photometry sensor for measuring the object brightness within the viewfinder observation frame. The imaging lens 6 is conjugate to the focusing screen 3 and photometry sensor 7 via a reflection optical path in the pentaprism 4.

Reference numeral 8 denotes a focal plane shutter. Reference numeral 9 denotes a photosensitive member which is a silver halide film or an image sensing element such as a CCD. Reference numeral 25 denotes a submirror which is obliquely inserted in the photographing optical path together with the main mirror 2 in the viewfinder observation state, and retracted from the photographing optical path in the photographing state. The submirror 25 deflects a ray having passed through the obliquely arranged main mirror 2, and guides the ray to the focus detection unit (to be described later).

Reference numeral 26 denotes a focus detection unit which is comprised of a secondary imaging mirror 27, a secondary imaging lens 28, a focus detection line sensor 29, a focus detection circuit (to be described later), and the like. The secondary imaging mirror 27 and secondary imaging lens 28 form a focus detection optical system, and form the secondary imaging plane of the photographing lens 11 on the focus detection line sensor 29. The focus detection unit 26 detects the focusing state of the photographing lens 11 by so-called phase difference detection, and sends the detection result to an autofocusing device which controls the focusing mechanism of the photographing lens.

Reference numeral 10 denote mount contacts serving as communication interfaces between the camera body 1 and the photographing lens 11.

Of the lenses 12 to 14, the first lens group (to be also referred to as a focusing lens hereinafter) 12 moves back and forth on the optical axis to adjust the focus position of the photographing frame. The second lens group 13 moves back and forth on the optical axis, changes the focal length of the photographing lens 11, and changes the magnification of the photographing frame. The lens 14 is a fixed third lens group. Reference numeral 15 denotes a stop. Reference numeral 16 denotes a driving motor which is a focus driving motor for moving the focusing lens 12 back and forth along the optical axis in autofocusing operation. Reference numeral 17 denotes a stop driving motor for changing the aperture diameter of the stop 15. Reference numeral 18 denotes a distance encoder 1. A brush 19 attached to the focusing lens 12 slides along with movement of the focusing lens 12. By utilizing this, the distance encoder 18 reads the position of the focusing lens 12 on the basis of the position of the brush 19, and generates a signal corresponding to the object distance. That is, the distance encoder 18, the brush 19, and a lens microcomputer 112 (to be described later) constitute an object distance detection means which reads the position of the focusing lens 12 after focusing and outputs a signal (object distance information) obtained by converting the position into an object distance.

Reference numeral 30 denotes a strobe light detachable from the camera body 1. The strobe light 30 is mounted on the camera body 1, and controls emission in accordance with a signal from the camera body 1. Reference numeral 31 denotes a xenon tube (to be referred to as an Xe tube hereinafter) which converts current energy into emission energy. Reference numerals 32 and 33 denote a reflecting plate and Fresnel lens which efficiently condense emission energy to an object to be photographed. Reference numeral 37 denotes a glass fiber which guides part of light emitted by the Xe tube 31 to a first light-receiving element 38 such as a photodiode in order to monitor the emission amount of the Xe tube 31. The emission amounts of preliminary emission and main emission of the Xe tube 31 can be monitored.

Reference numeral 35 denotes a second light-receiving element such as a photodiode for monitoring light emitted by the Xe tube 31. The emission current of the Xe tube 31 is limited by an output from the second light-receiving element 35, and flat emission is controlled. Reference numerals 34 and 36 denote light guides which are integrated with the reflector 33, and respectively reflect part of light from the Xe tube 31 to the second light-receiving element 35 and glass fiber 37. Reference numeral 39 denotes strobe light contacts serving as communication interfaces between the camera body 1 and the strobe light 30.

The circuit arrangement of the strobe light photographing system will be explained with reference to FIG. 2. The same reference numerals as in FIG. 1 denote the same parts.

A circuit arrangement in the camera body 1 will be described. A camera microcomputer 100 is connected to a focus detection circuit 105, the photometry sensor 7, a shutter control circuit 107, a motor control circuit 108, a switch sensing circuit 110, and a liquid crystal display circuit 111. The camera microcomputer 100 transfers signals via the mount contacts 10 to the lens control circuit 112 incorporated in the photographing lens 11. The camera microcomputer 100 transfers signals via the strobe light contacts 39 to a strobe light microcomputer 200 incorporated in the strobe light 30.

The focus detection circuit 105 performs storage control and read control of the focus detection line sensor 29 in accordance with signals from the camera microcomputer 100, and outputs pieces of pixel information to the camera microcomputer 100. The camera microcomputer 100 A/D-converts these pieces of information, and detects a focusing state by phase difference detection. The camera microcomputer 100 exchanges signals with the lens microcomputer 112, and performs focusing control of the photographing lens 11.

The photometry sensor 7 outputs brightness signals in a steady state in which the strobe light 30 does not preliminarily emit light toward an object to be photographed and in a state in which the strobe light 30 preliminarily emits light. The camera microcomputer 100 A/D-converts the brightness signals, calculates an F-number and shutter speed before photographing exposure adjustment, and calculates the emission amount of the strobe light in exposure. At the same time, the camera microcomputer 100 measures the color of the object, which will be described later.

In accordance with signals from the camera microcomputer 100, the shutter control circuit 107 controls energization of a front shutter curtain driving magnet MG-1 and rear shutter curtain driving magnet MG-2 which form the focal plane shutter 8. The shutter control circuit 107 operates the front and rear shutter curtains to perform exposure operation. The motor control circuit 108 controls a motor M in accordance with a signal from the camera microcomputer 100 to perform up-down operation of the main mirror 2, shutter charge, and the like.

SW1 represents a switch which is turned on by the first stroke (half stroke) of a release button (not shown) and starts photometry and AF (Auto Focusing). SW2 represents a switch which is turned on by the second stroke (full stroke) of the release button and starts shutter operation, i.e., exposure operation. SWFELK represents a switch which independently performs preliminary emission. The status signals of switches such as an ISO sensitivity setting switch, stop setting switch, and shutter speed setting switch which are operation members (not shown), in addition to the switches SW1, SW2, and SWFELK, are read by the camera microcomputer 100 via the switch sensing circuit 110.

The liquid crystal display circuit 111 controls a viewfinder display 24 and external display 42 in accordance with signals from the camera microcomputer 100.

An electrical circuit arrangement in the photographing lens 11 will be explained. The camera body 1 and photographing lens 11 are electrically connected to each other via the lens mount contacts 10. The mount contacts 10 include a contact L0 serving as a power supply contact for the focus driving motor 16 and stop driving motor 17 in the photographing lens 11, a power supply contact L1 for the lens microcomputer 112, a clock contact L2 for serial data communication, a contact L3 for transmitting data from the camera body 1 to the photographing lens 11, a contact L4 for transmitting data from the photographing lens 11 to the camera body 1, a motor ground contact L5 for a motor power supply, and a ground contact L6 for the power supply of the lens microcomputer 112.

The lens microcomputer 112 is connected to the camera microcomputer 100 via the lens mount contacts 10. In accordance with signals from the camera microcomputer 100, the lens microcomputer 112 operates the focus driving motor 16 for driving the focusing lens 12 and the stop driving motor 17 for driving the stop 15, adjusts the focus of the photographing lens 11, and controls the stop. Reference numerals 50 and 51 denote a photodetector and pulse plate. The lens microcomputer 112 counts the number of pulses to obtain position information of the focusing lens 12 in focusing (focusing operation). As a result, the focus of the photographing lens 11 can be adjusted. Position information of the focusing lens 12 read by the distance encoder 18 is input to the lens microcomputer 112. The lens microcomputer 112 converts the position information into object distance information, and transfers the object distance information to the camera microcomputer 100.

The photometry sensor 7 will be described with reference to FIG. 3. The photometry sensor 7 is an integrated circuit comprised of light-receiving elements such as silicon photodiodes, and an amplifier which amplifies a photocurrent generated by the light-receiving elements. FIG. 3 shows the light-receiving portions of the photometry sensor 7 when viewed from the incident surface.

The light-receiving portions of the photometry sensor 7 are so arranged as to receive light from almost the same range as the frame of an image sensing element or film 7. The light-receiving surface is divided into a plurality of regions P(0,0) to P(6,4) in FIG. 3. The number of regions coincides with the number of light-receiving portions (35 in this example). Each light-receiving portion is a light-receiving element such as a silicon photodiode, and when light impinges on it, generates a predetermined photocurrent. Photocurrent outputs are supplied to the camera microcomputer 100 sequentially from an upper left light-receiving element to a lower right light-receiving element via a known logarithmic compression amplifier. The camera microcomputer 100 A/D-converts outputs from the light-receiving elements, and can measure the brightness values of the portions within the photographing range as digital values.

Figure 4:
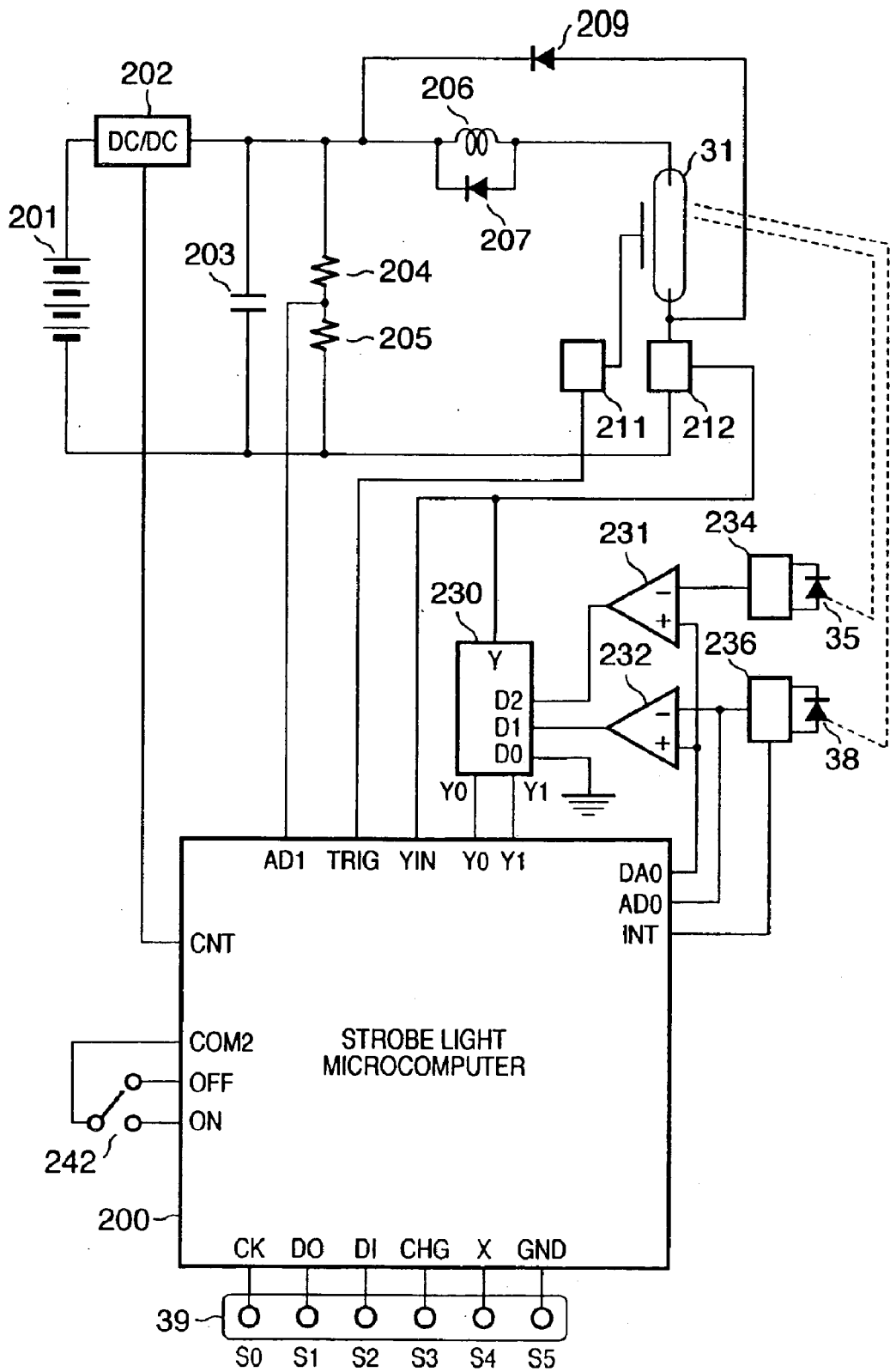
FIG. 4 is a block diagram showing the illustrative circuit arrangement of a strobe light serving as a building component of the strobe light photographing system according to the embodiment of the present invention.

The arrangement of the strobe light 30 will be described with reference to FIG. 4. In FIG. 4, the strobe light microcomputer 200 controls the overall operation of the strobe light 30. Reference numeral 201 denotes a power supply battery. Reference numeral 202 denotes a DC/DC converter which boosts the battery voltage to several hundred V. Reference numeral 203 denotes a main capacitor which stores emission energy. Reference numerals 204 and 205 denote resistors which divide the voltage of the main capacitor 203 at a predetermined ratio. Reference numeral 206 denotes a coil for limiting an emission current. Reference numeral 207 denotes a diode for absorbing a counterelectromotive voltage generated when emission is stopped. The xenon tube 31 is an Xe tube. Reference numeral 211 denotes a trigger generation circuit. Reference numeral 212 denotes an emission control circuit such as an IGBT.

Reference numeral 230 denotes a data selector which selects D0, D1, or D2 by a combination of two inputs Y0 and Y1 and outputs the selected signal to Y. Reference numeral 231 denotes a comparator for controlling the emission level of flat emission. Reference numeral 232 denotes a comparator for controlling the emission amount in flash emission (strobe light emission). The second light-receiving element 35 such as a photodiode is a light-receiving sensor for controlling flat emission, and monitors an optical output from the Xe tube 31. Reference numeral 234 denotes a photometry circuit which amplifies a small current flowing through the second light-receiving element 35 and converts the photocurrent into a voltage. The first light-receiving element 38 such as a photodiode is a light-receiving sensor for controlling flash emission, and monitors an optical output from the Xe tube 31. Reference numeral 236 denotes an integrating circuit for logarithmically compressing a photocurrent flowing through the first light-receiving element 38, and compressing and integrating the emission amount of the Xe tube 31.

The strobe light contacts 39 are arranged at a hot shoe in order to communicate with the camera body 1. Reference numeral 242 denotes a power switch for switching the strobe light 30 between power-on and power-off states.

The main terminals of the strobe light microcomputer 200 will be explained. CNT represents a control output terminal which controls charting of the DC/DC converter 202. COM2 represents a control output terminal corresponding to the ground potential of the switch 242. OFF represents an input terminal which is selected when the strobe light 30 is OFF. ON represents an input terminal which is selected when the strobe light 30 is ON. CK represents a sync clock input terminal for serial communication with the camera body 1. DO represents a serial output terminal for transferring serial data from the strobe light 30 to the camera body 1 in synchronism with a sync clock. DI represents a serial data input terminal for transferring serial data from the camera body 1 to the strobe light 30 in synchronism with a sync clock. CHG represents an output terminal which transmits as a current to the camera whether the strobe light can emit light, which is determined from the voltage of the main capacitor 203. X represents an input terminal for an emission start signal at the X contact of the camera. GND represents a ground contact.

INT represents the integral control output terminal of the integrating circuit 236. AD0 represents an A/D conversion input terminal for reading an integral voltage representing the emission amount of the integrating circuit 236. DA0 represents a D/A output terminal for outputting the comparison voltages of the comparators 231 and 232. Y0 and Y1 represent output terminals for the selection state of the data selector 230. YIN represents an input terminal for monitoring the output state of the data selector 230. TRIG represents an output terminal for an emission trigger. AD1 represents an A/D input terminal for monitoring the voltage of the main capacitor 203 via the voltage-dividing resistors 204 and 205.

Figure 5:
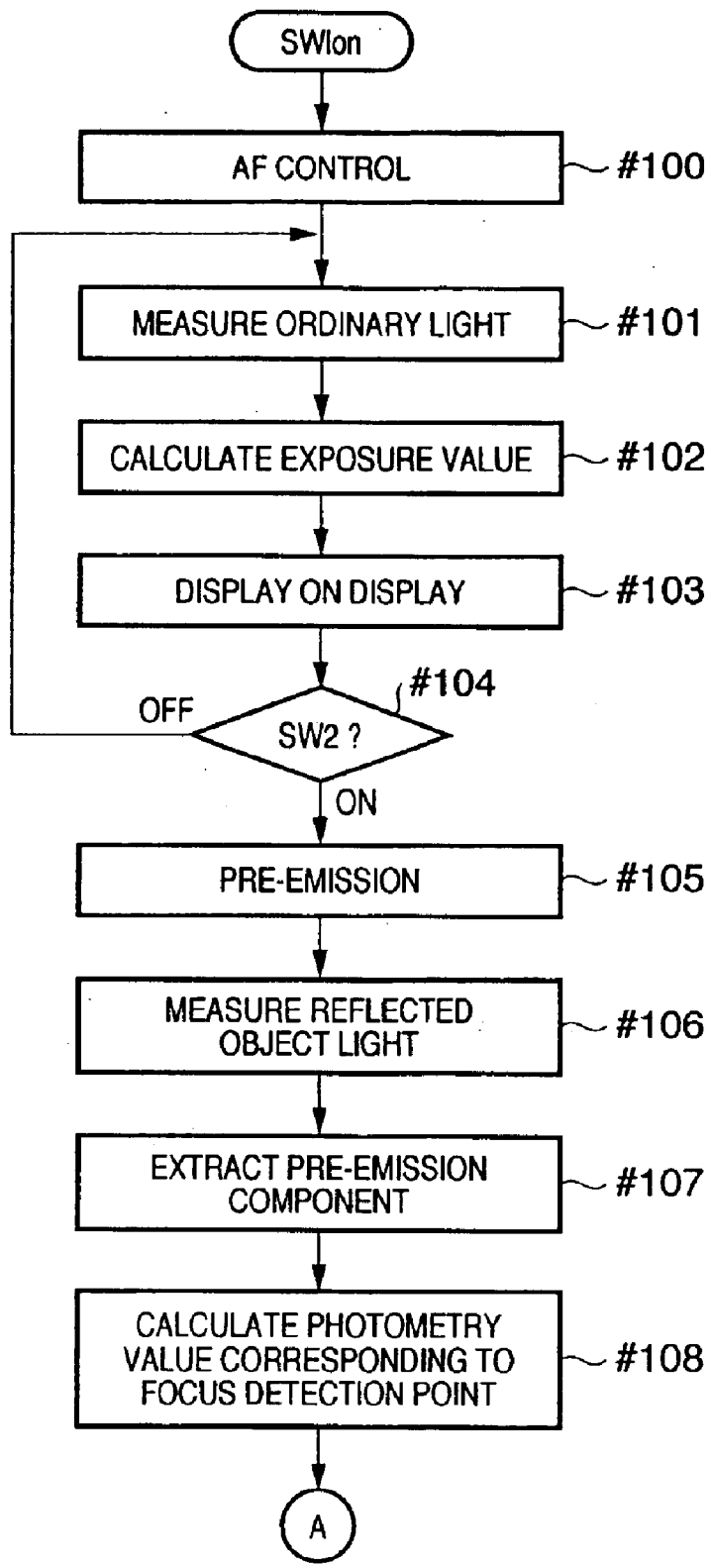
FIG. 5 is a flow chart showing part of operation in a camera body serving as a building component of the strobe light photographing system according to the embodiment of the present invention.
Figure 6:
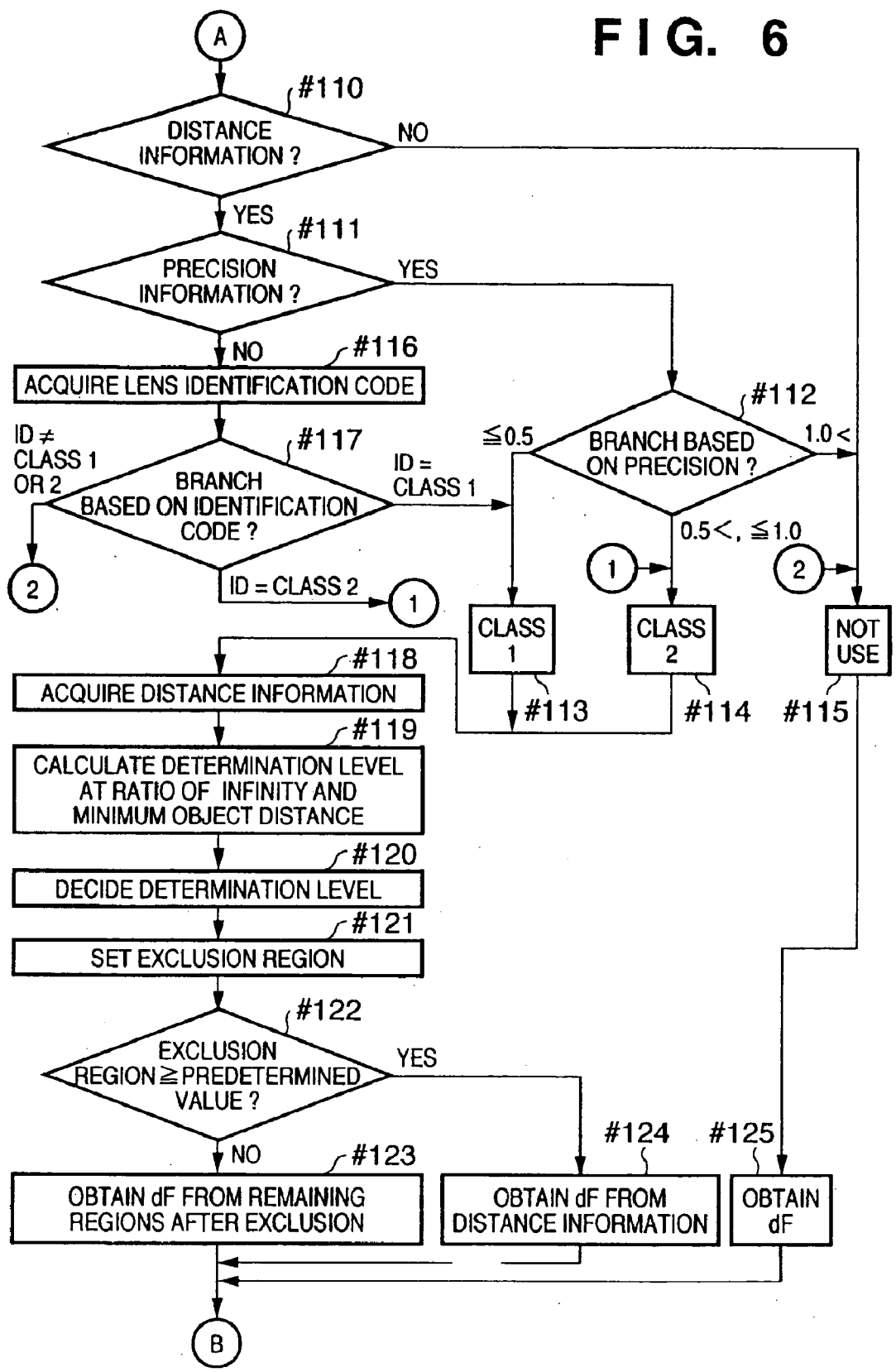
FIG. 6 is a flow chart showing operation subsequent to the operation in FIG. 5.

The operation of the strobe light photographing system having the above arrangement will be explained with reference to the flow charts of FIGS. 5 and 6.

Figure 2:
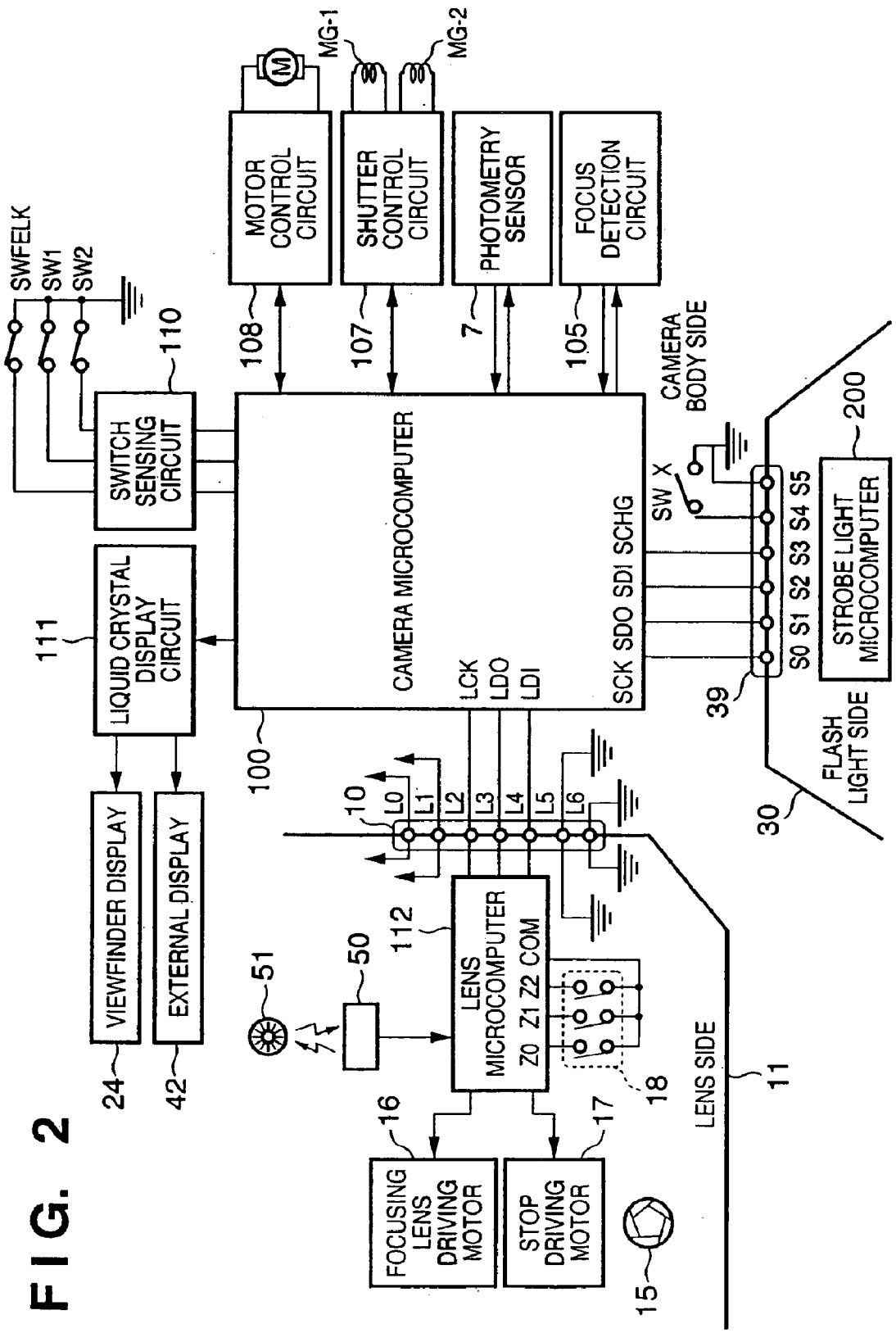
FIG. 2 is a block diagram showing the illustrative circuit arrangement of the strobe light photographing system according to the embodiment of the present invention.

When the switch SW1 of the camera body 1 shown in FIG. 2 is turned on, the operation starts in step #100. The camera microcomputer 100 detects the focus by a known method from a shift of an object image formed on the focus detection line sensor 29 within the focus detection unit 26 including the focus detection circuit 105. The camera microcomputer 100 calculates a lens driving amount to an in-focus position, and outputs the calculated lens driving amount to the lens microcomputer 112 via the serial communication lines LCK, LDO, and LDI. Upon reception of the lens driving amount, the lens microcomputer 112 drives the focus driving motor 16, and reads from the photodetector 50 rotation of the pulse plate 51 directly connected to the focus driving motor 16. If the focus driving motor 16 is driven by the designated driving amount, the lens microcomputer 112 stops the focus driving motor 16.

At the end of focusing operation, the flow advances to step #101. The camera microcomputer 100 instructs the photometry sensor 7 to measure brightness values Ba(0,0) to Ba(6,4) of ordinary light in the plurality of divided regions P(0,0) to P(6,4). The photometry result is logarithmically compressed by the logarithmic compression amplifier (not shown) in the photometry sensor 7, the logarithmic compression result is converted into a voltage value, and the voltage value is input to the camera microcomputer 100. The camera microcomputer 100 sequentially reads P(0,0) to P(6,4) via the A/D input terminals, adds full-aperture FNo (Avo) and aperture value correction (Avc) of the photographing lens 11, and stores the results as brightness data Bva(0,0) to BVa(6,4) of the respective portions in the internal RAM (not shown) of the camera microcomputer 100.

In step #102, the camera microcomputer 100 determines an exposure value (BVs) by a known method from the brightness values BVa(0,0) to BVa(6,4) in the measured regions. The camera microcomputer 100 determines a time value (TV) and aperture value (AV) in accordance with a set camera photographing mode.

In step #103, the TV value and AV value determined in step #102 are displayed on the viewfinder display 24 and external display 42. If the photographing start switch SW2 is ON in step #104, the flow advances to step #105; if OFF, returns to step #101.

In step #105, the camera microcomputer 100 instructs the strobe light microcomputer 200 on preliminary (pre) emission by serial communication via communication terminals S0, S1, and S2. Upon reception of this preliminary emission instruction, the strobe light microcomputer 200 performs preliminary emission operation at a predetermined light quantity.

Preliminary emission operation will be explained. The strobe light microcomputer 200 sets a predetermined voltage at the DA0 terminal in accordance with a predetermined emission level designated by the camera body 1. The strobe light microcomputer 200 outputs Hi and Lo to Y1 and Y0 to select the input D2. At this time, the Xe tube 31 has not emitted light yet, almost no photocurrent of the first light-receiving element 38 flows, and no output from the monitor circuit 234 to the inverting input terminal of the comparator 231 is generated. Hence, the output of the comparator 231 is Hi, and the emission control circuit 212 is turned on.

When a trigger signal is output from the TRIG terminal, the trigger generation circuit 211 excites the Xe tube 31 which has generated a high voltage, starting preliminary emission.

The strobe light microcomputer 200 instructs the integrating circuit 236 to start integration. The integrating circuit 236 which has received this instruction starts integrating an output from the monitor circuit 234, i.e., a logarithmically compressed photoelectric output from the first light-receiving element 38. At the same time, a timer which counts the emission time is activated.

After the start of preliminary emission, a photocurrent from the second light-receiving element 35 for controlling the emission level of flat emission increases, and an output from the monitor circuit 234 increases. When an output from the monitor circuit 234 becomes higher than a predetermined comparison voltage set at the non-inverting input of the comparator 231, an output from the comparator 231 is inverted to Lo, and the emission control circuit 212 cuts off the emission current of the Xe tube 31. Accordingly, the discharge loop is disconnected, but a flow-back loop is formed by the diode 207 and coil 206. After overshooting by a circuit delay settles, the emission current gradually decreases.

The emission level drops along with the decrease in emission current, the photocurrent of the second light-receiving element 35 decreases, and an output from the monitor circuit 234 also decreases. When the level reaches a predetermined comparison level, an output from the comparator 231 is inverted to Hi again, and the emission control circuit 212 is turned on again. The discharge loop of the Xe tube 31 is formed, the emission current increases, and the emission level also rises.

In this manner, the comparator 231 repetitively increases and decreases the emission level within a short cycle by using as a center a predetermined comparison voltage set at DA0. Consequently, flat emission in which emission continues at an almost constant desired emission level.

When the timer counts the lapse of a predetermined emission time, the strobe light microcomputer 200 sets Lo at the Y1 and Y0 terminals. In response to this, the input D0, i.e., Lo-level input of the data selector 230 is selected, and the output forcibly changes to Lo level. The emission control circuit 212 disconnects the discharge loop of the Xe tube 31, thereby ending preliminary emission (flat emission).

At the end of emission, the strobe light microcomputer 200 reads from the A/D input terminal AD0 an output from the integrating circuit 236 which integrates the preliminary emission amount, and A/D-converts the output, reading the integral value, i.e., the emission amount in preliminary emission as a digital value.

At the end of preliminary emission, the flow advances to step #106. Reflected object light by preliminary emission is received by the photometry sensor 7 of the camera body 1 via the photographing lens 11. Reflected object light in preliminary emission is calculated for each block by the same method as step #101, measuring object brightness values BVf(0,0) to BVf(6,4) by reflected light from the strobe light.

The flow advances to step #107. The camera microcomputer 100 subtracts an object brightness BVa(x,y) by natural light obtained in step #101 from an object brightness BVf(x,y) in preliminary emission, and extracts only a brightness value dF(x,y) of only reflected light by preliminary emission.

In step #108, the photometry value of reflected object light that corresponds to a focus detection point (meaning a region where defocus information is detected) is calculated. For descriptive convenience, in the first embodiment, the focus detection point is set to the center (P(3,2) in FIG. 3) of the 35-division photometry sensor 7, the light adjustment area is set to 3×3 regions centered at P(3,2), and the average value of these regions is defined as a photometry value. That is, an average photometry value dFave of reflected object light is given from the values dF(x,y) of the regions of the photometry sensor 7 obtained in step #107:

$$dFave=(dF(2,1),+dF(3,1)+dF(4,1)+dF(2,2)+dF(3,2)+dF(4,2)+dF(2,3)+dF(3,3)+dF(4,3))/9$$

In this example, the values dF(x,y) are uniformly averaged. Alternatively, the values dF(x,y) may be averaged by setting the weight of the focus detection region relatively high and the value of the peripheral region relatively low.

In step #110, whether the lens has object distance information (to be also simply referred to as distance information hereinafter) is determined from a status determination signal from the photographing lens 11. If YES in step #110, the flow advances to step #111; if NO, to step #115. The status determination signal of the lens is information acquired from the photographing lens by serial communication between the camera and the lens.

If the lens is determined to have distance information and the flow advances to step #111, whether the lens has distance precision information contained in the status determination signal is determined. If YES in step #111, the flow advances to step #112; if NO, to step #116.

In step #112, since the lens has both the distance information and distance precision information, the flow branches to any one of steps #113, #114, and #115 in accordance with the acquired precision information. If the lens is identified from the acquired precision information to be a new model in which focusing division has a precision of 0.5 to the distance apex value (DV), the lens is classified to class 1 (#113). If the lens is identified to be an old model in which focusing division has a precision of 1.0 to the distance apex value (DV), the lens is classified to class 2 (#114). If focusing division does not have any precision of even 1 to the distance apex value (DV), the lens is classified to a lens having no distance information (#115). If the flow advances to step #113 or #114, it advances to step #120; if the flow advances to #115, to step #125.

For a lens having distance information but no distance precision information, the flow advances from step #111 to step #116, and a lens identification code (ID code: value different between lens models) is read from the photographing lens 11 by serial communication between the camera and the lens. In step #117, the flow branches in accordance with the lens identification code acquired from the photographing lens in step #116. For example, the flow advances to step #115 for a lens whose distance information cannot be used for the precision, step #113 for a lens corresponding to class 1, and step #114 for a lens corresponding to class 2.

In step #118, object distance information is read from the photographing lens 11 by serial communication between the camera and the lens. In step #119, the distance information range precision is calculated from the distance information acquired in step #118:

Distance range precision=2*log 2 (infinity distance/minimum object distance)

For example,

Infinity distance: 235 cm

Minimum object distance: 199 cm $$\text{Precision} = 2*\log2(\text{infinity distance}/\text{minimum object distance})$$
$$= 2*\log2(235/199)$$
$$= 0.48\ (EV)$$

In step #120, the class determined in step #113 or #114 is corrected on the basis of the precision determined from the infinity distance information and minimum object distance information in #119 in order to decide the determination level of the abnormal reflection region. Class 1 has a precision of 0.5, and class 2 has a precision of 1.0. The precision in an actual distance zone is given priority to finally decide the class. That is, when even a lens of class 1 with a precision of 0.5 has only a precision of 1 in a region close to infinity, this lens is treated as a lens of class 2. A determination level LVL0 is read out from a table in FIG. 8 representing the determination level on the basis of the finally determined class and object distance information. In FIG. 8, object distance information is obtained by dividing by the focal length the infinity focal length of the photographing lens 11 that is read in step #118.

In step #121, a photometry level LVL1 for correct exposure is given by

LVL1=PRG−log 2 (infinity distance)+*K*

PRG: pre-emission guide number

K: constant

A determination level LVL2 for determining an abnormal reflection region is given by

*LVL2=LVL1+LVL0*

A region where the photometry value is higher than the sum of the photometry level LVL1 for correct exposure and the abnormal reflection determination level LVL2 is excluded as an abnormal reflection region from the light adjustment region. That is, the photometry values dF(0,0) to dF(6,4) of reflected object light in the regions of the photometry sensor 7 that are obtained in step #107 are compared with LVL2, and if a photometry value is larger than LVL2, this sensor area is determined as an ineffective area (exclusion region).

In step #122, if the level of the exclusion region is equal to or higher than a predetermined value, i.e., most of the frame is determined to be an abnormal reflection region, the flow advances to step #124; if NO, to step #123.

If most of the frame is determined not to be an abnormal reflection region and the flow advances to step #123, the photometry value dF is calculated from the remaining regions after exclusion:

$$dF = \text{SUM}(dFs \text{ of effective regions})/\text{the number of effective regions}$$

Figure 9:
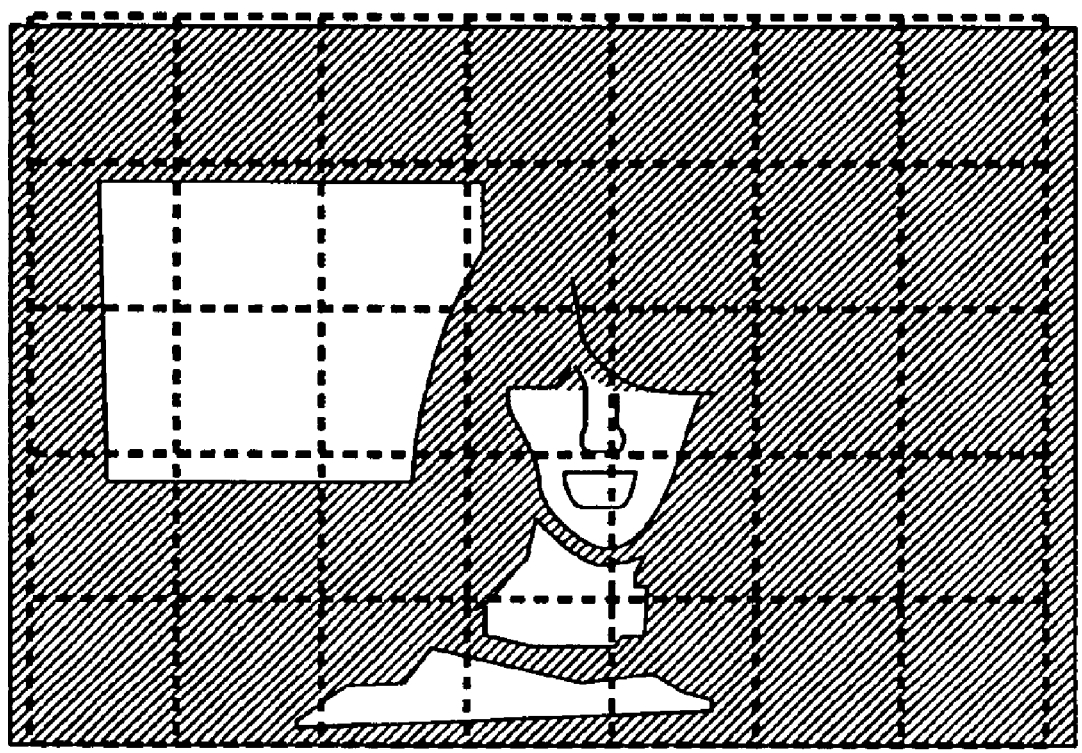
FIG. 9 is a view showing an example of an object influenced by abnormal reflection according to the embodiment of the present invention.

FIGS. 9 and 10 show an example for an actual object. Regions indicated by dotted lines in FIG. 9 are divided photometry regions shown in FIG. 3. An area (P(1,1) to P(2,2)) surrounded by a bold line in FIG. 10 is a region where the photometry value dF(x,y) of reflected light is higher than the abnormal reflection region determination level LVL2 obtained in step #121. This region is therefore excluded from the light adjustment target. A region (P(2,1) to P(4,3)) surrounded by a bold dotted line is a light adjustment range when the focus detection point is set to the center (P(3,2)). When the average value of reflected object light is calculated from the light adjustment range, the abnormal reflection regions P(2,1) and P(2,2) are excluded, preventing underexposure of the principal object due to the abnormal reflection regions.

If most of the frame is determined in step #122 to be an abnormal reflection region, the flow advances to step #124. In this case, light adjustment using only the remaining regions results in a large error. Thus, the proper photometry level LVL1 calculated in step #121 is used as the photometry value dF.

$$dF = LVL1$$

If no distance information is used, the flow advances from step #115 to step #125, and the levels of the regions are averaged in accordance with the focus detection point to calculate the photometry value dF. That is, when the focus detection point is P(3,2) at the center of the frame, $$dF = \text{SUM}(P(2,1) \text{ to } P(4,3))/9$$

After that, the flow advances to step #126 to obtain an main emission amount γ.

In step #120, object distance information is read from the photographing lens 11 by serial communication between the camera and the lens. In the embodiment, the infinity distance and minimum object distance of the zone are read from the lens zone encoder (distance encoder 18). In step #121, proper photometry level (LVL0) is obtained from the infinity distance information and minimum object distance information acquired in step #120 on the assumption that the object has the standard reflectance (22%):

$$LVL0F = PRG - \log 2 \text{ (infinity distance)} + K$$

$$LVL0N = PRG - \log 2 \text{ (minimum object distance)} + K$$

$$LVL0 = (LVL0F + LVL0N)/2$$

PRG: preliminary emission guide number
K: constant

In step #122, a contribution DVK is determined in accordance with the distance precision and object distance.

FIG. 8 is a table showing numeric values which are stored in the internal ROM of the camera microcomputer 100 in order to determine a contribution corresponding to the distance precision and object distance. In FIG. 8, the distance precision corresponds to class 1 and class 2. The contribution is acquired from the table of FIG. 8 in accordance with the distance precision class and a value obtained by dividing object distance information acquired in step #120 by the focal length (f) of the photographing lens 11. As the distance becomes longer, it cannot be accurately measured (error increases). A contribution corresponding to the distance information precision and distance information is therefore acquired from the table of FIG. 8.

In step #123, a photometry value dFtave which considers the contribution (DVK) is calculated on the basis of the photometry value dFave of the reflected object light component obtained in step #108 as the photometry value of reflected object light by preliminary emission:

$$dFtave = dFave*(1-DVK) + LVL0*DVK$$

DVK: contribution

In step #124, whether the difference between the photometry value dFtave obtained in step #123 and the photometry value dFave of the reflected object light component obtained in step #108 is equal to or smaller than a predetermined value (e.g., 0.5) is determined. If YES in step #124, the flow directly advances to step #126 without employing the photometry value dFtave which considers the contribution calculated from the distance information; if NO, to #125 because the photometry value dFtave which considers the contribution is used.

When the photometry value dFtave which considers the contribution and the photometry value dFave of only reflected object light are equal to or smaller than the predetermined value, the photometry value which considers the contribution is not employed to prevent variations in strobe light exposure due to an autofocus detection error upon photographing the same object at the same distance.

If the photometry value dFtave which considers the contribution calculated from the distance information in step #123 is used, the flow advances to step #125. In order to validate the distance information, dFtave calculated in step #123 replaces dFave (dF=dFt).

In step #126, an main emission amount γ of a final light adjustment area is calculated in each region of the 35-division photometry sensor 7:

$$\gamma = BVt - dFave$$

Note that BVt is calculated from the TV value and AV value obtained in step #102:

$$BVt = TV + AV - SV$$

SV: speed value

In step #127, the camera microcomputer 100 instructs the strobe light microcomputer 200 on the calculated main emission amount γ via the communication terminals S0, S1, and S2 by serial communication. The flow then advances to step #130.

In step #130, whether the shutter speed is equal to or lower than the tuning speed is determined. If the shutter speed is equal to or lower than the tuning speed, the flow advances to #131, and the camera microcomputer 100 transmits a flash emission mode to the strobe light microcomputer 200. If the shutter speed is higher than the tuning speed, the flow advances to step #132, and the camera microcomputer 100 transmits a flat emission mode and flat emission time (time obtained by adding the curtain speed to the shutter speed) to the strobe light microcomputer 200.

In step #133, the main mirror 2 is moved up and retracted from the photographing optical path. At the same time, the camera microcomputer 100 instructs the lens microcomputer 112 to narrow down the stop 15. In step #134, the flow waits until the main mirror 2 completely retracts from the photographing optical path. After the main mirror 2 completely retracts from the photographing optical path, the flow advances to step #135, and the camera microcomputer 100 energizes the front shutter curtain driving magnet MG-1 to start opening the focal plane shutter 8.

In step #136, whether the emission mode is the flat (FP) emission mode is determined. For the flat emission mode, the flow advances to step #138. For the flash emission mode, the flow advances to step #137, and waits until the front curtain of the focal plane shutter 8 is completely opened and power is supplied to an X contact represented by SWX in FIG. 2. After that, the flow advances to step #138.

In step #138, the strobe light microcomputer 200 performs main emission control corresponding to the emission mode designated by the camera microcomputer 100. That is, the strobe light microcomputer 200 performs flat emission control for the flat emission mode, and flash emission control for the flash emission mode.

Flash emission control will be explained. Flash emission control is done when the camera shutter speed is equal to or lower than the tuning speed of the strobe light. In this case, the strobe light microcomputer 200 outputs to the DA0 terminal a control voltage corresponding to a set manual emission amount. This voltage is obtained by adding a control voltage corresponding to the light quantity difference between preliminary emission and main emission to the output voltage, i.e., integral voltage of the integrating circuit 236 which has been described in preliminary emission.

For example, let V1 be the integral voltage upon preliminary emission at a light quantity which is $1/32$ of the full emission amount. For the same main emission amount of $1/32$, emission is stopped when the voltage reaches the same integral voltage. Thus, V1 is set as the comparison voltage of the comparator 232. Similarly, for an main emission amount of $1/16$, emission is stopped when the voltage reaches an interval voltage larger by one step than that in preliminary emission. A voltage corresponding to one step is added to the integral voltage in preliminary emission, and the resultant voltage is set as the comparison voltage of the comparator 232.

The strobe light microcomputer 200 outputs "0 and 1" to the Y1 and Y0 terminals, and selects the flash emission control comparator 232 connected to the D1 input of the data selector 230. At this time, the Xe tube 31 has not emitted light yet, and almost no photocurrent flows through the first light-receiving element 38. The integrating circuit 236 does not generate any output, and the − input voltage of the comparator 232 is lower than that at the + input terminal. Hence, the output voltage of the comparator 232 changes to high level, and the emission control circuit 212 is turned on. At the same time, the strobe light microcomputer 200 outputs a Hi signal for a predetermined time from the TRIG terminal. The trigger circuit 211 generates a high trigger voltage. Upon application of a high voltage to the trigger electrode of the Xe tube 31, the Xe tube 31 starts emitting light.

After the Xe tube 31 starts emitting light, a photocurrent flows through the first light-receiving element 38, and an output from the integrating circuit 236 increases to a predetermined voltage set at the + input terminal of the comparator 232. The comparator 232 is then inverted, its output voltage changes to low level, and the emission control circuit 212 is turned off, stopping emission.

At this time, the Xe tube 31 has generated a predetermined emission amount and stops emission, obtaining a desired light quantity necessary for strobe light photographing.

Flat emission control will be explained. Flat emission control is done when the camera shutter speed is higher than the tuning speed of the strobe light. The strobe light microcomputer 200 outputs to the DA0 terminal a control voltage corresponding to a set manual flat emission amount. This voltage is obtained by adding a control voltage corresponding to the light quantity difference between preliminary emission and main emission to a voltage set as the comparison voltage of the comparator 231 in preliminary emission.

For example, let V1 be the control voltage upon preliminary emission at a light quantity which is $1/32$ of the full emission amount. In emission at the same main emission amount of $1/32$, flat emission control suffices to be executed at the same control voltage. Thus, V1 is set as the comparison voltage of the comparator 231. Similarly, for an main emission amount of $1/16$, the control voltage is set larger by one step than that in preliminary emission. A voltage corresponding to one step is added to the integral voltage in preliminary emission, and the resultant voltage is set as the comparison voltage of the comparator 232.

The strobe light microcomputer 200 outputs "1 and 0" to the Y1 and Y0 terminals, and selects the flat emission control comparator 231 connected to the D2 input of the data selector 230. Thereafter, flat emission is performed by the same operation as the above-described preliminary emission operation. Upon the lapse of a predetermined time designated by the camera microcomputer 100, the Y1 and Y0 terminals of the strobe light microcomputer 200 are set to "0 and 0", ending emission processing.

Figure 7:
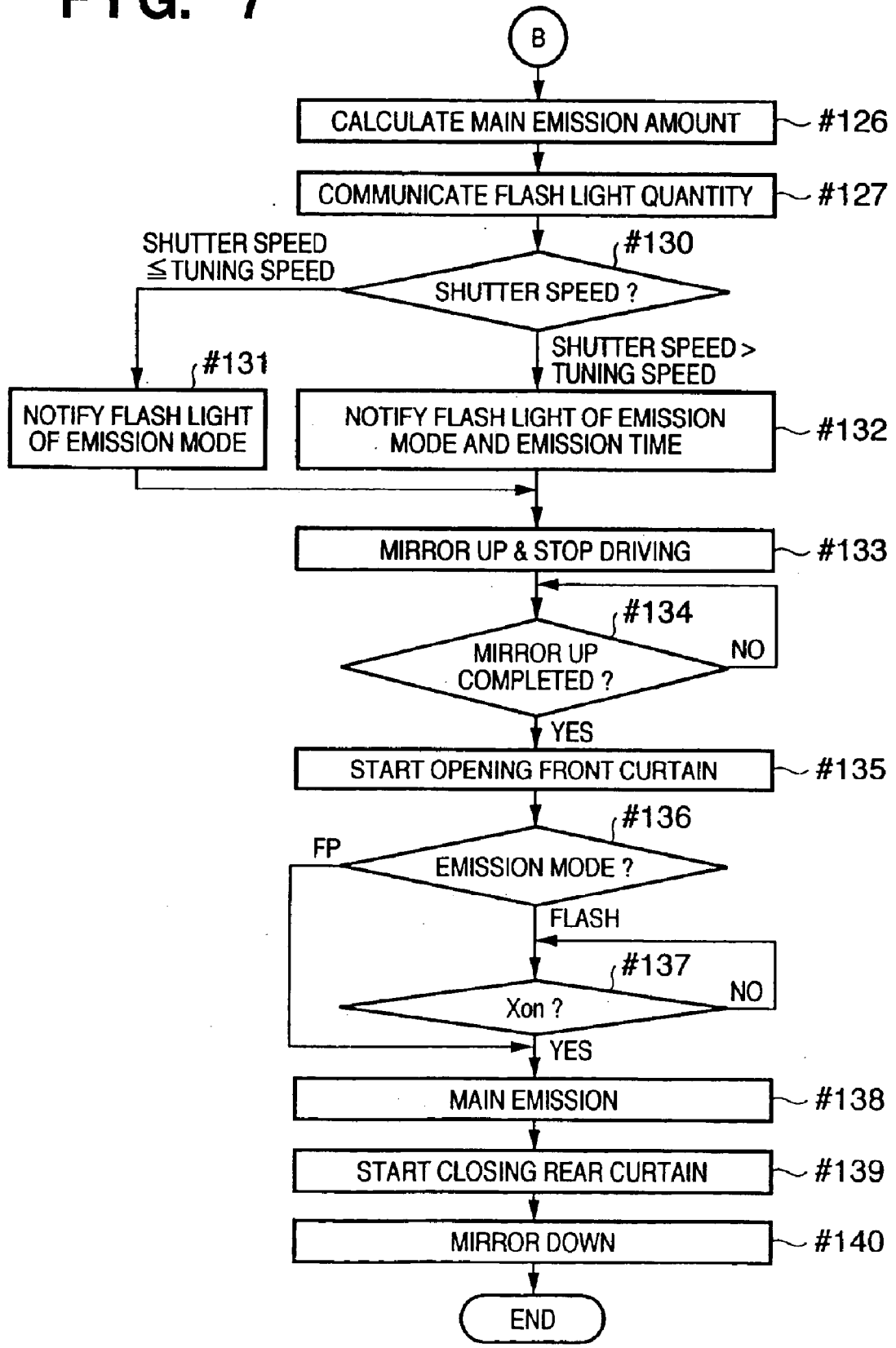
FIG. 7 is a flow chart showing operation subsequent to the operation in FIG. 6.

Referring back to FIG. 7, the flow advances to step #139 upon the lapse of a predetermined full-aperture shutter time. The camera microcomputer 100 energizes the rear shutter curtain driving magnet MG-2, and closes the rear curtain of the focal plane shutter 8, ending exposure. When the emission mode is flat emission, emission continues until the rear curtain is completely closed. After the end of a series of photographing sequences, the flow advances to step #140 to move down the main mirror 2 and end photographing.

According to the above embodiment, the strobe light photographing system comprises a means (step #108 in FIG. 5) for calculating first photometry data (dFave) obtained by the photometry sensor 7 (more specifically, 3×3 regions including a focus detection point out of 35 regions having undergone photometry) which measures light reflected by an object in preliminary emission, a means (distance encoder 18, brush 19, and lens microcomputer 112) for detecting object distance information, a means (step #121 in FIG. 6) for calculating proper second photometry data (LVL0) on the basis of the object distance information, a means (steps #122 and #123 in FIG. 6) for calculating third photometry data (dFtave) from the first photometry data, the second photometry data, and a contribution (DVK) corresponding to the distance information and distance precision, and a means (steps #124 to #126 in FIG. 6) for controlling an main emission amount on the basis of the third photometry data and performing strobe light photographing.

That is, the third photometry data (dFtave) is calculated in consideration of the contribution (DVK) corresponding to the distance information and distance precision, in addition to the first and second photometry data, thereby controlling the main emission amount. This can prevent underexposure or overexposure caused by adjusting exposure to a high-or low-reflectance region even when the principal object is white or wears a black dress. In other words, proper strobe light photographing which is almost free from the influence of the object reflectance and an autofocus detection error can be achieved.

In the above embodiment, the contribution is obtained in accordance with the distance information and distance precision. Even when the contribution is obtained from only the distance information, more preferable strobe light photographing than the prior art can be performed. However, a more preferable result can be attained using precision information, like the above embodiment.

Whether the difference between the third photometry data (dFtave) and the first photometry data (dFave) is equal to or smaller than a predetermined value (e.g., 0.5 (=class 2)) is determined. If so, the flow directly advances to step #126 without employing the third photometry value (dFtave) which considers the contribution calculated from the distance information. Also in terms of this, strobe light photographing hardly suffers an autofocus detection error.

According to the above embodiment, the strobe light photographing system comprises a means (distance encoder 18, brush 19, and lens microcomputer 112) for detecting object distance information from the position of the focusing lens 12, a means (steps #111 to #117 in FIG. 6) for determining the precision of the detected distance information, a means (step #121 in FIG. 6) for calculating a proper photometry level LVL1 from the distance information, a means (step #121 in FIG. 6) for calculating an identification level LVL2 for identifying an abnormal reflection region on the basis of the proper photometry level LVL1 and the distance precision (distance range precision in step #119 in FIG. 6) set in accordance with the determination result of the distance precision, and a means (step #121 in FIG. 6) for comparing the photometry values of a plurality of regions (more specifically, light adjustment regions in FIG. 3) with the identification level LVL2 to determine an abnormal reflection region out of the plurality of regions. The main emission amount is controlled to perform strobe light photographing by the photometry values dF of reflected object light in the plurality of regions from which the abnormal reflection region is excluded (#124 in FIG. 6).

Strobe light photographing is executed at photometry values obtained from a plurality of regions from which an abnormal reflection region is excluded, preventing underexposure of the principal object due to the abnormal reflection region. That is, optimal strobe light emission control corresponding to the precision of distance information can be performed regardless of a lens having low distance information precision, or a short-focus lens through which the precision decreases as the object distance becomes longer.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A system which includes a camera body, an interchangeable lens mounted on the camera body, and a strobe light mounted on the camera body, and performs preliminary emission before main emission in strobe light photographing, comprising:

a unit which has a plurality of regions for splitting a field into a plurality of fields and performing photometry, and measures light reflected by an object to be photographed by preliminary emission in the plurality of regions;

a unit which detects distance information of the object from a position of a focusing lens;

a unit which determines precision of the distance information;

a unit which calculates a proper photometry level from the distance information;

a unit which calculates an identification level for identifying an abnormal reflection region on the basis of the proper photometry level and a distance precision set in accordance with a determination result of the precision;

a unit which compares photometry values of the plurality of regions or light adjustment regions out of the plurality of regions with the identification level, thereby determining an abnormal reflection region; and a unit which controls an main emission amount by photometry values of reflected object light in the plurality of regions or the light adjustment regions out of the plurality of regions from which the abnormal reflection region is excluded.

2. The system according to claim 1, wherein said unit which determines the distance precision determines the distance precision in accordance with identification data stored in the interchangeable lens.

3. The system according to claim 1, wherein said unit which determines the distance precision determines the distance precision in accordance with an information signal corresponding to the distance precision of the interchangeable lens, and is arranged in the camera body.

4. The system according to claim 1, wherein said unit which determines the distance precision determines the distance precision in accordance with individual lens information of the interchangeable lens, and is arranged in the camera body.

5. The system according to claim 1, wherein said unit which determines the distance precision determines the distance precision on the basis of a ratio of upper and lower limit values of distance information data of the interchangeable lens, and is arranged in the camera body.

6. A camera which controls a strobe light to execute preliminary emission before main emission, comprising:

a unit which has a plurality of regions for splitting a field into a plurality of fields and performing photometry of light reflected by an object to be photographed by preliminary emission in the plurality of regions;

a unit which determines precision of a distance information from a interchangeable lens mounted on the camera body;

a unit which calculates a proper photometry level from the distance information;

a unit which calculates an identification level for identifying an abnormal reflection region on the basis of the proper photometry level and a distance precision set in accordance with a determination result of the precision;

a unit which compares photometry values of the plurality of regions out of the plurality of regions with the identification level, thereby determining an abnormal reflection region;

a unit which measures a photometry values of reflected object light in the plurality of regions out of the plurality of regions from which the abnormal reflection region is excluded; and a unit which controls an main emission amount by the photometry values of reflected object light.

7. The camera according to claim 6, wherein said unit which determines the distance precision determines the distance precision in accordance with identification data stored in the interchangeable lens.

8. The camera according to claim 6, wherein said unit which determines the distance precision determines the distance precision in accordance with an information signal corresponding to the distance precision of the interchangeable lens.

9. The camera according to claim 6, wherein said unit which determines the distance precision determines the distance precision in accordance with individual lens information of the interchangeable lens.

10. The camera according to claim 6, wherein said unit which determines the distance precision determines the distance precision on the basis of a ratio of upper and lower limit values of distance information data of the interchangeable lens.

11. A method for controlling a strobe light to execute preliminary emission before main emission, comprising the steps of:

performing photometry by splitting light reflected by an object to be photographed by preliminary emission into a plurality of regions;

determining precision of a distance information from a interchangeable lens mounted on a camera body;

calculating a proper photometry level from the distance information;

calculating an identification level for identifying an abnormal reflection region on the basis of the proper photometry level and a distance precision set in accordance with a determination result of the precision;

comparing photometry values of the plurality of regions out of the plurality of regions with the identification level, thereby determining an abnormal reflection region;

measuring a photometry values of reflected object light in the plurality of regions out of the plurality of regions from which the abnormal reflection region is excluded; and controlling an main emission amount by the photometry values of reflected object light.

12. The method according to claim 11, wherein the step of determining the distance precision comprising the step of determining the distance precision in accordance with identification data stored in the interchangeable lens.

13. The method according to claim 11, wherein the step of determining the distance precision comprising the step of determining the distance precision in accordance with an information signal corresponding to the distance precision of the interchangeable lens.

14. The method according to claim 11, wherein the step of determining the distance precision comprising the step of determining the distance precision in accordance with individual lens information of the interchangeable lens.

15. The method according to claim 11, wherein the step of determining the distance precision comprising the step of determining the distance precision on the basis of a ratio of upper and lower limit values of distance information data of the interchangeable lens.

* * * * *